(12) United States Patent
Cheng

(10) Patent No.: US 9,725,927 B1
(45) Date of Patent: Aug. 8, 2017

(54) SYSTEM FOR INTELLIGENT DOOR KNOB (HANDLE)

(71) Applicant: August Home, Inc, San Francisco, CA (US)

(72) Inventor: Shih Yu Thomas Cheng, Union City, CA (US)

(73) Assignee: August Home, Inc., San Francisco, CA (US)

( * ) Notice: Subject to any disclaimer, the term of this patent is extended or adjusted under 35 U.S.C. 154(b) by 622 days.

(21) Appl. No.: 14/321,000

(22) Filed: Jul. 1, 2014

Related U.S. Application Data

(63) Continuation-in-part of application No. 14/205,608, filed on Mar. 12, 2014, now Pat. No. 9,322,194.

(51) Int. Cl.
```
G05B 19/00      (2006.01)
E05B 47/02      (2006.01)
E05B 41/00      (2006.01)
```

(52) U.S. Cl.
CPC ............ *E05B 47/026* (2013.01); *E05B 41/00* (2013.01)

(58) Field of Classification Search
CPC .... E05B 41/00; E05B 47/026; G07C 9/00309
USPC .............. 340/5.64, 5.7, 5.85, 541, 542, 551
See application file for complete search history.

(56) References Cited

U.S. PATENT DOCUMENTS

| | | | |
|---|---|---|---|
| 2,680,177 A | 6/1954 | Rosenthal | |
| 5,306,407 A | 4/1994 | Hauzer et al. | |
| 5,407,035 A | 4/1995 | Cole et al. | |
| 5,695,048 A | 12/1997 | Tseng | |
| 6,196,936 B1 | 3/2001 | Meckel | |
| 6,323,846 B1 | 11/2001 | Westerman et al. | |
| 6,570,557 B1 | 5/2003 | Westerman et al. | |
| 6,612,415 B2 | 9/2003 | Yamane | |
| 6,677,932 B1 | 1/2004 | Westerman | |
| 7,614,008 B2 | 11/2009 | Ording | |
| 7,633,076 B2 | 12/2009 | Huppi et al. | |
| 7,653,883 B2 | 1/2010 | Hotelling et al. | |
| 7,657,849 B2 | 2/2010 | Chaudhri et al. | |
| 7,663,607 B2 | 2/2010 | Hotelling et al. | |
| 7,844,914 B2 | 11/2010 | Andre et al. | |
| 8,006,002 B2 | 8/2011 | Kalayjian et al. | |
| 8,239,784 B2 | 8/2012 | Hotelling et al. | |
| 8,279,180 B2 | 10/2012 | Hotelling et al. | |
| 8,347,720 B2 | 1/2013 | De Los Santos et al. | |

(Continued)

FOREIGN PATENT DOCUMENTS

| | | |
|---|---|---|
| CA | 2676196 A1 | 7/2008 |
| EP | 0486657 A1 | 5/1992 |

(Continued)

*Primary Examiner* — Tai T Nguyen
(74) *Attorney, Agent, or Firm* — Paul Davis

(57) ABSTRACT

A door lock system includes a knob and an apparatus that controls transmission of displacement or rotational mechanical energy. A bolt is coupled to a door, an input rod and an output rod. At least one of an interior or exterior knob is coupled to the bolt and the apparatus that controls transmission of displacement or rotational mechanical energy. An energy source is coupled to the apparatus that controls transmission of displacement or rotational mechanical energy. The mobile device provides authorization to engage the apparatus that controls transmission of displacement or rotational mechanical energy and allows a door user to manually open the door.

25 Claims, 5 Drawing Sheets

(56) References Cited

U.S. PATENT DOCUMENTS

| | | |
|---|---|---|
| 8,351,789 B2 | 1/2013 | Wagener et al. |
| 8,405,387 B2 | 3/2013 | Novak et al. |
| 8,476,577 B2 | 7/2013 | Nagahama et al. |
| 8,479,122 B2 | 7/2013 | Hotelling et al. |
| 8,522,596 B2 | 9/2013 | Avery |
| 8,525,102 B2 | 9/2013 | Augustyniak et al. |
| 8,542,189 B2 | 9/2013 | Milne et al. |
| 8,544,326 B2 | 10/2013 | Je |
| 8,600,430 B2 | 12/2013 | Herz et al. |
| 2002/0015024 A1 | 2/2002 | Westerman et al. |
| 2005/0248444 A1* | 11/2005 | Joao .................. B60R 25/042 340/426.13 |
| 2005/0252739 A1 | 11/2005 | Callahan et al. |
| 2006/0026536 A1 | 2/2006 | Hotelling et al. |
| 2006/0033724 A1 | 2/2006 | Chaudhri et al. |
| 2006/0197753 A1 | 9/2006 | Hotelling |
| 2007/0150842 A1 | 6/2007 | Chaudhri et al. |
| 2012/0319827 A1 | 12/2012 | Pance et al. |
| 2013/0063138 A1 | 3/2013 | Takahashi et al. |
| 2013/0064378 A1 | 3/2013 | Chuang |
| 2015/0109104 A1* | 4/2015 | Fadell .................. G08B 27/003 340/5.65 |

FOREIGN PATENT DOCUMENTS

| | | |
|---|---|---|
| EP | 0907068 A1 | 4/1999 |
| EP | 1404021 A2 | 3/2004 |
| EP | 2428774 A1 | 3/2012 |
| EP | 2454558 A1 | 5/2012 |
| EP | 2564165 A2 | 3/2013 |
| EP | 2579002 A1 | 4/2013 |
| EP | 2642252 A1 | 9/2013 |

\* cited by examiner

SYSTEM FOR INTELLIGENT DOOR KNOB (HANDLE)

CROSS-REFERENCE TO RELATED APPLICATIONS

This application is a continuation in part of U.S. Ser. No. 14/205,608 filed Mar. 12, 2014, now U.S. Pat. No. 9,322,194 which application is fully incorporated herein by reference.

FIELD OF THE INVENTION

The present invention relates to door lock devices, and more particularly to intelligent door knob systems.

DESCRIPTION OF THE RELATED ART

Door lock assemblies often include deadbolts. Typically such an assembly included a latch which is depressed during closure of the door and, with substantially complete closure, extends into a recess of the door strike. Such a latch by itself is often easy to improperly depress-release by an unauthorized person, with a card-type element or even a pry bar. Also the outer knob assembly can be torqued off with a wrench to gain access to the mechanism and thereby to the room closed by the door. Deadbolts are not as susceptible to these unauthorized activities. Doors having deadbolts typically use a latch mechanism. This is because (1) the latch holds the door snug against rattling whereas the deadbolt by necessity must have clearance between it and the strike plate recess edges (but because of the clearance, the door can rattle), and (2) the latch automatically holds the door shut since it is only momentarily depressed during door closure from its normally extended condition and then extends into a door strike recess when the door is fully closed.

Except in rare devices where the deadbolt is operated by an electrical solenoid, the deadbolt, to be effective, must be manually thrown by a person inside the room or building, or if the deadbolt is actuatable by an external key, the person leaving the room or building must purposely engage the deadbolt by a key as the person leaves. However, if a person forgets to so actuate the deadbolt, either manually with an inner hand turn when inside, or by a key outside, an intruder need only inactivate the latch mechanism in order to gain unauthorized entry. Motel and hotel rooms often do not even have a key actuated deadbolt and thus are particularly susceptible to unauthorized entry and theft when the person is not in the room.

In recent years, mechanisms were developed to enable retraction, i.e. Inactivation, of the deadbolt simultaneously with the latch for quick release even under panic exit conditions. But to lock the door still required manual actuation of the deadbolt with the inner hand turn or a key on the outside.

In one door lock assembly a deadbolt is shiftable between an extended lock position and a retracted position and means for shifting the deadbolt from the extended position to the retracted position which is characterized by biasing means for applying a bias on the deadbolt toward the extended lock position; restraining means for restraining the deadbolt in the retracted position against the bias of the biasing means and being actuatable to release the deadbolt to enable the biasing means to shift the deadbolt to the extended lock position; and trigger means. For actuating the restraining means to release the deadbolt and thereby allow the biasing means to shift the deadbolt to the extended lock position.

Such a door lock assembly is for use in a door frame and thus the invention extends to the door lock assembly of the present invention in cooperation with a door frame.

Some deadbolt locks are automatically actuated with closure of the door, the deadbolt being mechanically actuated to the extended lock position. The deadbolt in its retracted position is spring-biased toward the extended lock position, but is retained in a cocked condition by a deadbolt restraining and releasing device which is trigger actuatable to activate the deadbolt into its locked condition. The trigger mechanism may have a portion that protrudes from the door to engage the door strike of the door frame upon closure of the door, thereby causing the deadbolt to be released and shifted to the locked condition. The protruding portion of the trigger mechanism can also serve to hold the door snug against rattling.

In another door lock assembly for a hinged door and cooperative with a door strike of a door frame, a deadbolt is provided mounting in the door. The dead bolt is shift able between a retracted non-lock position and an extended lock position. It includes a manually operable device for shifting the deadbolt from the extended lock position to the retracted non-lock position. A biasing device applies a bias on the deadbolt toward the extended lock position. A restraining device is biased into a restraining relationship with the deadbolt in the retracted position. This restrains the deadbolt in the retracted position against the bias of the biasing device. A trigger releases a restraining means when the trigger is actuated and includes a protruding portion for engaging a door strike for actuating the trigger. A door strike includes a surface to engage and depress the trigger protruding portion for actuation of the trigger and release of the deadbolt restraining means, and includes an opening to receive the deadbolt when extended.

The use of electronic systems for the control and operation of locks is becoming increasingly common. The present invention is directed to an arrangement that permits the electronic and manual control of the lock operation to be separated to allow manual operation of the lock independently of the electronic drive system for the lock. The lock of the present invention is useful in situations where an electronic controller is temporarily unavailable, for example where a controller has been lost, misplaced or damaged.

There are currently some electronic deadbolt lock arrangements. In one device, a lock has a bolt movable between locked and unlocked conditions. The lock has a manual control device that serves to operate the lock between locked and unlocked conditions. A power drive is coupled by a transmission to the manual control device. The lock is operated between the locked and unlocked conditions in response to operation of the power drive. A transmission mechanism couples the manual control device and the power drive, whereby the lock moves between the locked and unlocked conditions. The transmission mechanism is operable to decouple the power drive from the manual control means to enable the lock to be operated by the manual control device independently of the power drive.

SUMMARY OF THE INVENTION

An object of the present invention is to provide an intelligent door knob.

Another object of the present invention is to provide an intelligent door knob that includes an apparatus that controls transmission of displacement or rotational mechanical energy.

A further object of the present invention is to provide an intelligent door knob that includes an energy source coupled to an apparatus that controls transmission of displacement or rotational mechanical energy to a bolt.

Yet another object of the present invention is to provide an intelligent door knob in communication with a mobile device, with the mobile device providing authorization to engage the apparatus that controls transmission of displacement or rotational mechanical energy and allows a door user to manually open the door.

These and other objects of the present invention are achieved in a door lock system with a knob and an apparatus that controls transmission of displacement or rotational mechanical energy. A bolt is coupled to a door, an input rod and an output rod. The bolt locks and unlocks the door in response transmission of displacement or delivery of rotational mechanical energy. At least one of an interior or exterior knob is coupled to the bolt and the apparatus that controls transmission of displacement or rotational mechanical energy. An energy source is coupled to the apparatus that controls transmission of displacement or rotational mechanical energy. A wireless communication device is in communication with a mobile device. The mobile device provides authorization to engage the apparatus that controls transmission of displacement or rotational mechanical energy and allows a door user to manually open the door.

DETAILED DESCRIPTION

Figure 1:
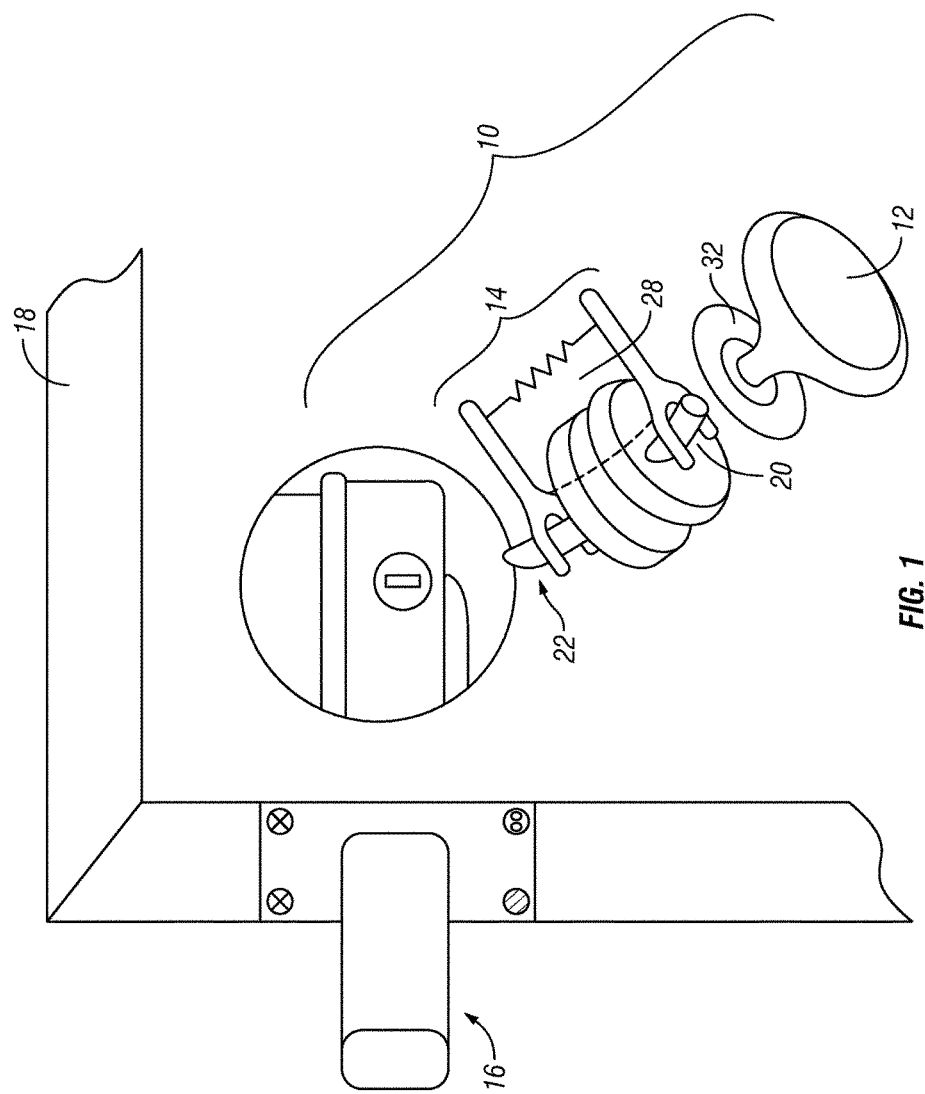
FIGS. 1 and 2 illustrate one embodiment of a door lock system of the present invention, with a knob includes an apparatus that controls transmission of displacement or rotational mechanical energy.

As used herein, the term engine refers to software, firmware, hardware, or other component that can be used to effectuate a purpose. The engine will typically include software instructions that are stored in non-volatile memory (also referred to as secondary memory). When the software instructions are executed, at least a subset of the software instructions can be loaded into memory (also referred to as primary memory) by a processor. The processor then executes the software instructions in memory. The processor may be a shared processor, a dedicated processor, or a combination of shared or dedicated processors. A typical program will include calls to hardware components (such as I/O devices), which typically requires the execution of drivers. The drivers may or may not be considered part of the engine, but the distinction is not critical.

As used herein, the term database is used broadly to include any known or convenient means for storing data, whether centralized or distributed, relational or otherwise.

As used herein a mobile device includes, but is not limited to, a cell phone, such as Apple's iPhone®, other portable electronic devices, such as Apple's iPod Touches®, Apple's iPads®, and mobile devices based on Google's Android® operating system, and any other portable electronic device that includes software, firmware, hardware, or a combination thereof that is capable of at least receiving the signal, decoding if needed, exchanging information with a server to verify information. Typical components of mobile device may include but are not limited to persistent memories like flash ROM, random access memory like SRAM, a camera, a battery, LCD driver, a display, a cellular antenna, a speaker, a Bluetooth® circuit, and WIFI circuitry, where the persistent memory may contain programs, applications, and/or an operating system for the mobile device. A mobile device can be a key fob A key fob which can be a type of security token which is a small hardware device with built in authentication mechanisms. It is used to manage and secure access to network services, data, provides access, communicates with door systems to open and close doors and the like.

As used herein, the term "computer" or "mobile device or computing device" is a general purpose device that can be programmed to carry out a finite set of arithmetic or logical operations. Since a sequence of operations can be readily changed, the computer can solve more than one kind of problem. A computer can include of at least one processing element, typically a central processing unit (CPU) and some form of memory. The processing element carries out arithmetic and logic operations, and a sequencing and control unit that can change the order of operations based on stored information. Peripheral devices allow information to be retrieved from an external source, and the result of operations saved and retrieved.

As used herein, the term "Internet" is a global system of interconnected computer networks that use the standard Internet protocol suite (TCP/IP) to serve billions of users worldwide. It is a network of networks that consists of millions of private, public, academic, business, and government networks, of local to global scope, that are linked by a broad array of electronic, wireless and optical networking technologies. The Internet carries an extensive range of information resources and services, such as the inter-linked hypertext documents of the World Wide Web (WWW) and the infrastructure to support email. The communications infrastructure of the Internet consists of its hardware components and a system of software layers that control various aspects of the architecture, and can also include a mobile device network, e.g., a cellular network.

As used herein, the term "extranet" is a computer network that allows controlled access from the outside. An extranet can be an extension of an organization's intranet that is extended to users outside the organization that can be partners, vendors, and suppliers, in isolation from all other Internet users. An extranet can be an intranet mapped onto the public Internet or some other transmission system not accessible to the general public, but managed by more than one company's administrator(s). Examples of extranet-style networks include but are not limited to:

LANs or WANs belonging to multiple organizations and interconnected and accessed using remote dial-up LANs or WANs belonging to multiple organizations and interconnected and accessed using dedicated lines Virtual private network (VPN) that is comprised of LANs or WANs belonging to multiple organizations, and that extends usage to remote users using special "tunneling" software that creates a secure, usually encrypted network connection over public lines, sometimes via an ISP As used herein, the term "Intranet" is a network that is owned by a single organization that controls its security policies and network management. Examples of intranets include but are not limited to:

A LAN

A Wide-area network (WAN) that is comprised of a LAN that extends usage to remote employees with dial-up access A WAN that is comprised of interconnected LANs using dedicated communication lines A Virtual private network (VPN) that is comprised of a LAN or WAN that extends usage to remote employees or networks using special "tunneling" software that creates a secure, usually encrypted connection over public lines, sometimes via an Internet Service Provider (ISP)

For purposes of the present invention, the Internet, extranets and intranets collectively are referred to as ("Network Systems").

As used herein, "Haptic Feedback", "Haptic technology", or "Haptic", is a visual, audio or tactile feedback and visual technology which takes advantage of the sense of an event, by touch, visual or audio. Haptic feedback can be by applying forces, vibrations, visual and audio feedback or motions to the user. This mechanical stimulation can be used to assist in the creation of virtual objects in a computer simulation, to control such virtual objects, and to enhance the remote control of machines and devices (telerobotics). It has been described as doing for the sense of touch what computer graphics does for vision. Haptic devices can incorporate tactile sensors that measure forces exerted by the user on the interface. When referring to mobile phones and similar devices, this generally means the use of vibrations from the device's vibration alarm to denote that a touch-screen button has been pressed. In this particular example, the phone would vibrate slightly in response to the user's activation of an on-screen control, making up for the lack of a normal tactile response that the user would experience when pressing a physical button. Haptic feedback can provide a visual indication of an event.

Figure 2:
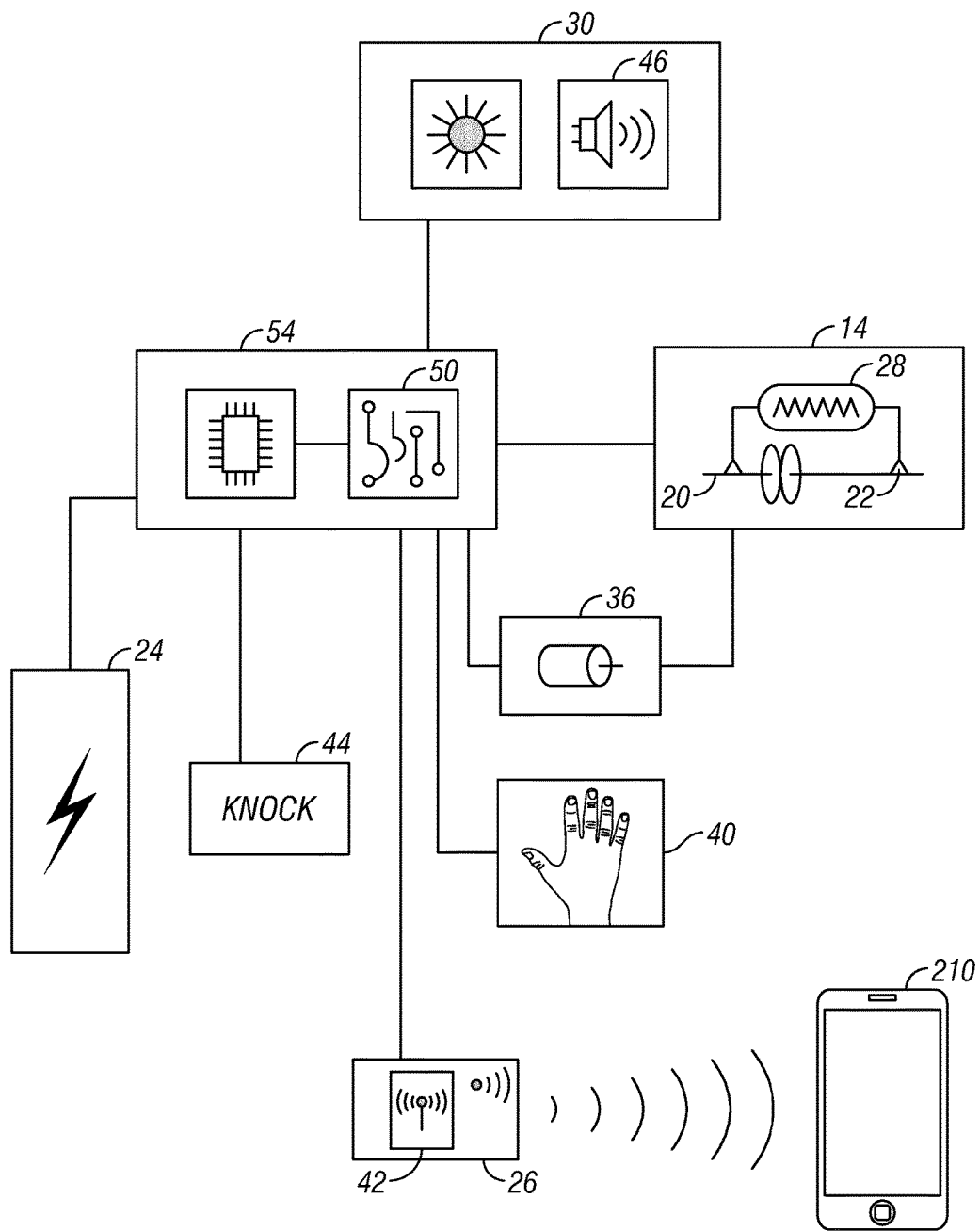

In one embodiment of the present invention, illustrated in FIGS. 1 and 2, a door lock system 10 with a knob 12 includes an apparatus that controls transmission of displacement or rotational mechanical energy 14. A bolt 16 is coupled to a door 18. The bolt 16 is coupled to an input rod 20 and an output rod 22. The bolt 16 locks and unlocks a door 18 in response to transmission of displacement or delivery of rotational mechanical energy 14. At least one of an interior or exterior knob 12 is coupled to the bolt 16 and the apparatus that controls transmission of displacement or rotational mechanical energy 14.

An energy source 24 is coupled to the apparatus that controls transmission of displacement or rotational mechanical energy 14. A wireless communication device 26 is in communication with a mobile device 210. The mobile device 210 provides authorization to engage the apparatus that controls transmission of displacement or rotational mechanical energy 14 and allows a door user to manually open the door 18.

In one embodiment, an actuator 28 is coupled to the apparatus that controls transmission of displacement or rotational mechanical energy 14. The actuator 28 enables the apparatus to provide its operation of transmission of displacement or rotational mechanical energy 14.

In one embodiment, an audio or visual indicator 30 is provided and provides a confirmation of a door 18 locking.

In one embodiment, the system 10 is configured to identify the door user based on a door user's habits and/or behavior patterns from the system 10 or information obtained from the system back-end 56 that can be included in a database.

The door 18 is unlocked by movement of the input rod 20, output rod 22 and the bolt 16.

In one embodiment, the energy source 24 is one or more batteries. The batteries can be rechargeable batteries. In one embodiment, the batteries are positioned in an interior of the knob 12.

The knob 12 can have a first end section 32 and a section end section 34. The first end section 32 is closer to the to the door bolt 16 than the second end section 34.

In one embodiment, the apparatus that controls transmission of displacement or rotational mechanical energy 14 is at the first end section 32 of the knob 12.

The apparatus that controls transmission of displacement or rotational mechanical energy 14 can be in an interior of the first end section 32.

In one embodiment, the energy source 24, and the wireless communication device 26 are positioned in an interior of the knob 12.

In one embodiment, following authorization that the door 18 can be opened using the mobile device 210, and the like, the apparatus that controls transmission of displacement or rotational mechanical energy 14 is operated and engaged to open the door 18. Following authorization, the knob 12 is moved which causes the output rod 22 to move.

A device 36 can be included that converts energy into mechanical energy 14 coupled to a circuit 50, the input rod 20 and the device 14 that converts energy being coupled to the energy source 24 to receive energy from the energy source 24. In one embodiment, the device 36 can be included that converts energy into mechanical energy 36 is a motor.

An engine 54 with processor can be included to operate elements of the system 10. As described hereafter.

In one embodiment, the input rod 20 and the output rod 22 are inter-changeable relative to door 18 opening, dosing and access.

The device that converts energy into mechanical energy 14 imparts movement to the input rod 20.

In one embodiment, the knob 12 includes a haptic device 40.

The system 10 can also include an RF transmitter or receiver 42. The system 10 can also include a knock sensor 44. An audio speaker or audio microphone 46 can also be included in the system 10 and coupled to the circuit. One or more LED's 48 can be coupled to the circuit 50.

One or more buttons 52 can be included for locking.

In one embodiment, the knob 12 is a door handle.

In one embodiment, an engine 54 with a memory is coupled to the circuit 50 and the wireless communication device 26. The engine 54 executes instructions received from the mobile device 210 with the circuit 50 to execute operation of the system 10 and its components, as described above.

The system 10 can have a system back-end 56, as more fully described in U.S. Ser. No. 14/205,608 filed Mar. 12, 2014, incorporated herein by reference.

As a non-limiting example, the apparatus that controls transmission of displacement or rotational mechanical energy 14 is a clutch with first and second elements configured to be engaged and disengaged.

Figure 3:
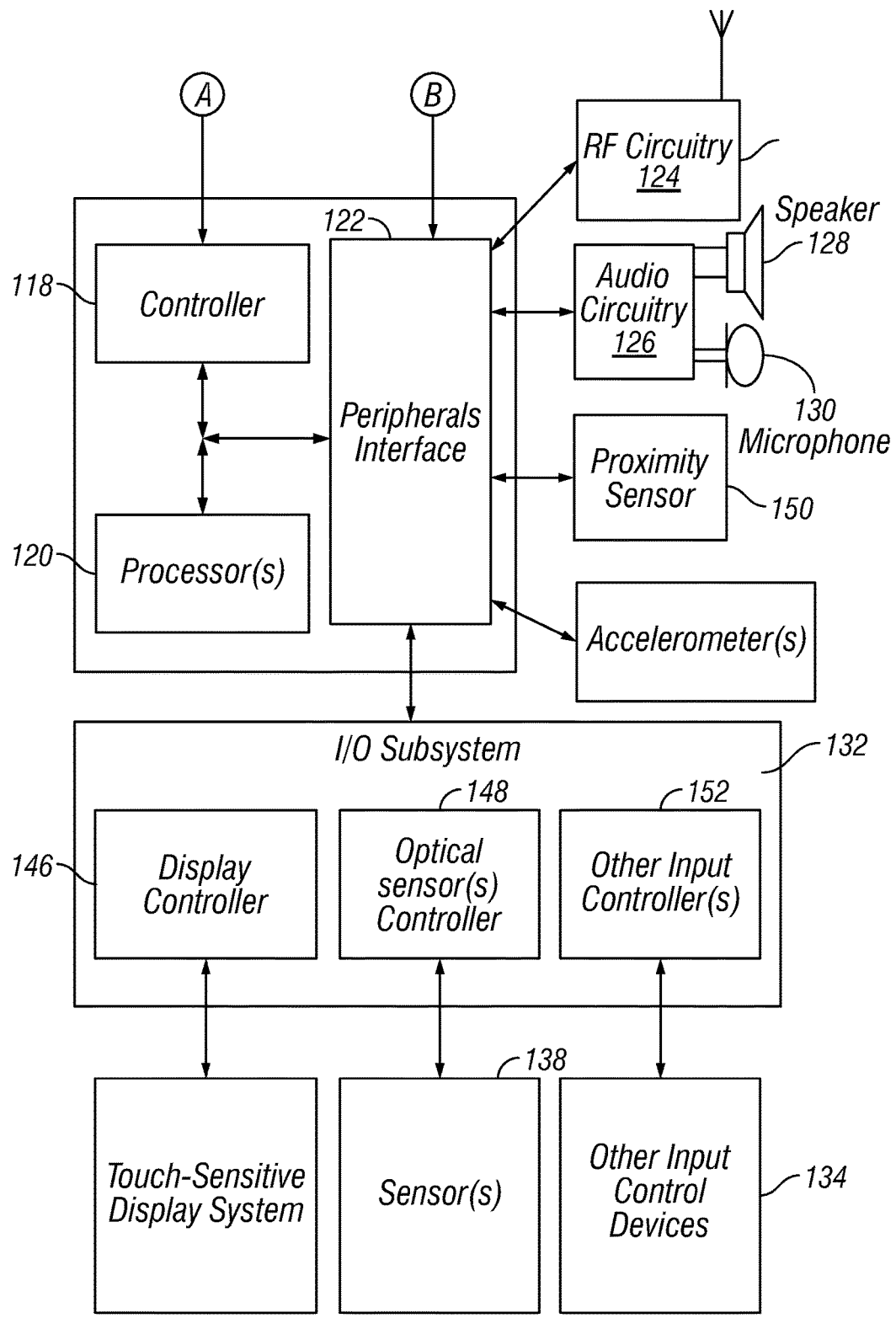
FIGS. 3-5 illustrate one embodiment of a mobile device that can be used with the present invention.

Referring now to FIG. 3, 112 is a block diagram illustrating embodiments of a mobile or computing device 210 that can be used with intelligent door lock system 10.

The mobile or computing device 210 can include a display 114 that can be a touch sensitive display. The touch-sensitive display 114 is sometimes called a "touch screen" for convenience, and may also be known as or called a touch-sensitive display system. The mobile or computing device 210 may include a memory (which may include one or more computer readable storage mediums), a memory controller 118, one or more processing units (CPU's) 120, a peripherals interface 122, Network Systems circuitry 124, including but not limited to RF circuitry, audio circuitry 126, a speaker 128, a microphone 130, an input/output (I/O) subsystem 132, other input or control devices 134, and an external port. The mobile or computing device 210 may include one or more optical sensors 138. These components may communicate over one or more communication buses or signal lines 140.

Figure 4:
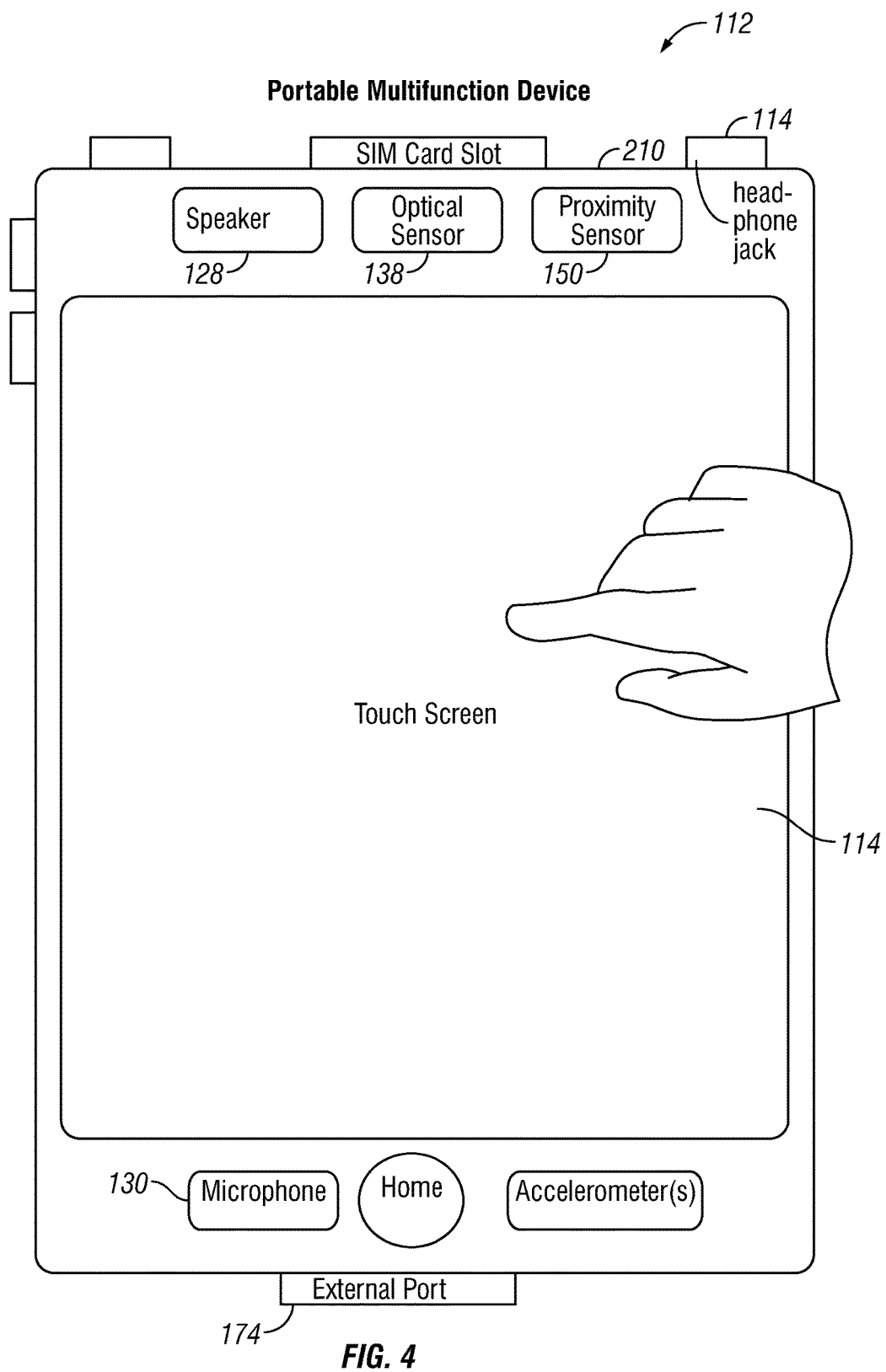
Figure 5:
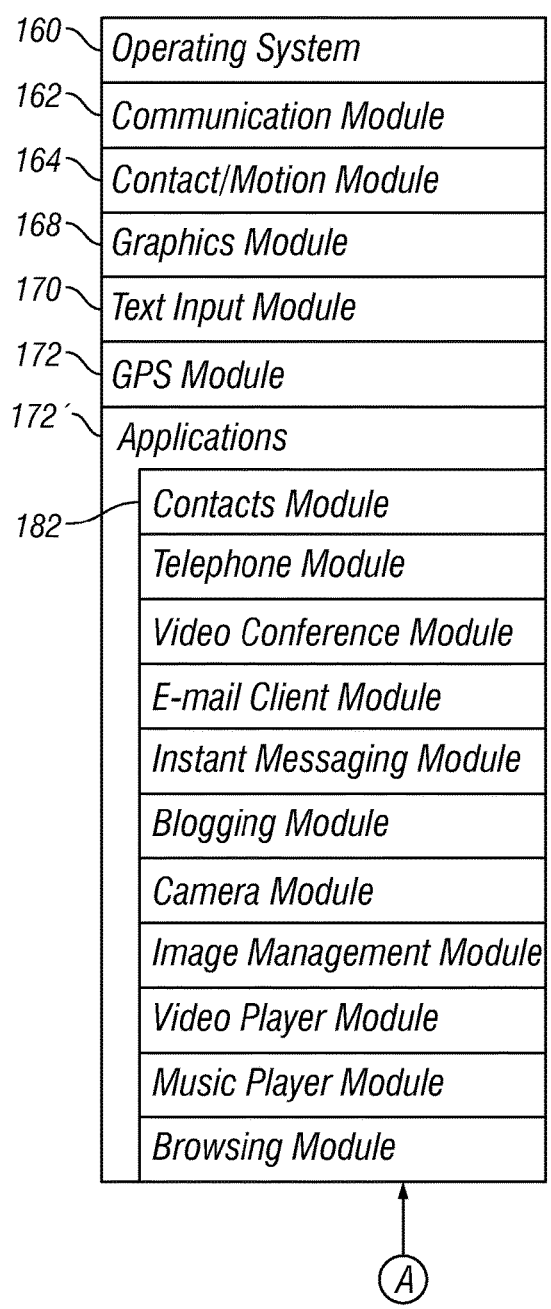
Figure 5:
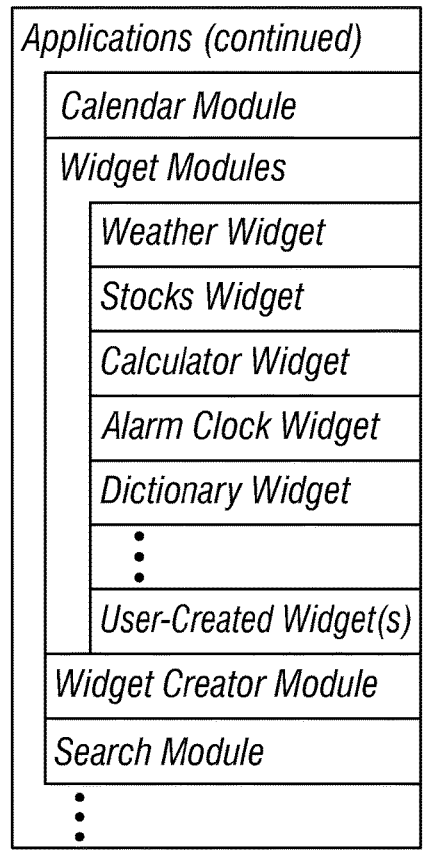

It should be appreciated that the mobile or computing device 210 is only one example of a portable multifunction mobile or computing device 210, and that the mobile or computing device 210 may have more or fewer components than shown, may combine two or more components, or a may have a different configuration or arrangement of the components. The various components shown in FIG. 4 may be implemented in hardware, software or a combination of hardware and software, including one or more signal processing and/or application specific integrated circuits.

Memory 116 may include high-speed random access memory and may also include non-volatile memory, such as one or more magnetic disk storage devices, flash memory devices, or other non-volatile solid-state memory devices. Access to memory 116 by other components of the mobile or computing device 210, such as the CPU 120 and the peripherals interface 122, may be controlled by the memory controller 118.

The peripherals interface 122 couples the input and output peripherals of the device to the CPU 120 and memory 116. The one or more processors 120 run or execute various software programs and/or sets of instructions stored in memory 116 to perform various functions for the mobile or computing device 210 and to process data.

In some embodiments, the peripherals interface 122, the CPU 120, and the memory controller 118 may be implemented on a single chip, such as a chip 142. In some other embodiments, they may be implemented on separate chips.

The Network System circuitry receives and sends signals, including but not limited to RF, also called electromagnetic signals. The Network System circuitry converts electrical signals to/from electromagnetic signals and communicates with communications networks and other communications devices via the electromagnetic signals. The Network Systems circuitry may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The Network Systems circuitry may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication.

The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), BLUETOOTH®, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

The audio circuitry 126, the speaker 128, and the microphone 130 provide an audio interface between a user and the mobile or computing device 210. The audio circuitry 126 receives audio data from the peripherals interface 122, converts the audio data to an electrical signal, and transmits the electrical signal to the speaker 128. The speaker 128 converts the electrical signal to human-audible sound waves. The audio circuitry 126 also receives electrical signals converted by the microphone 130 from sound waves. The audio circuitry 126 converts the electrical signal to audio data and transmits the audio data to the peripherals interface 122 for processing. Audio data may be retrieved from and/or transmitted to memory 116 and/or the Network Systems circuitry by the peripherals interface 122. In some embodiments, the audio circuitry 126 also includes a headset jack (e.g. 114, FIG. 4). The headset jack provides an interface between the audio circuitry 126 and removable audio input/output peripherals, such as output-only headphones or a headset with both output (e.g., a headphone for one or both ears) and input (e.g., a microphone).

The I/O subsystem 132 couples input/output peripherals on the mobile or computing device 210, such as the touch screen 114 and other input/control devices 134, to the peripherals interface 122. The I/O subsystem 132 may include a display controller 146 and one or more input controllers 210 for other input or control devices. The one or more input controllers 1 receive/send electrical signals from/ to other input or control devices 134. The other input/control devices 134 may include physical buttons (e.g., push buttons, rocker buttons, etc.), dials, slider switches, and joysticks, click wheels, and so forth. In some alternate embodiments, input controller(s) 152 may be coupled to any (or none) of the following: a keyboard, infrared port, USB port, and a pointer device such as a mouse. The one or more buttons may include an up/down button for volume control of the speaker 128 and/or the microphone 130. The one or more buttons may include a push button. A quick press of the push button may disengage a lock of the touch screen 114 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button may turn power to the mobile or computing device 210 on or off. The user may be able to customize a functionality of one or more of the buttons. The touch screen 114 is used to implement virtual or soft buttons and one or more soft keyboards.

The touch-sensitive touch screen 114 provides an input interface and an output interface between the device and a user. The display controller 146 receives and/or sends electrical signals from/to the touch screen 114. The touch screen 114 displays visual output to the user. The visual output may include graphics, text, icons, video, and any combination thereof (collectively termed "graphics"). In some embodiments, some or all of the visual output may correspond to user-interface objects, further details of which are described below.

A touch screen 114 has a touch-sensitive surface, sensor or set of sensors that accepts input from the user based on haptic and/or tactile contact. The touch screen 114 and the display controller 146 (along with any associated modules and/or sets of instructions in memory 116) detect contact (and any movement or breaking of the contact) on the touch screen 114 and converts the detected contact into interaction with user-interface objects (e.g., one or more soft keys, icons, web pages or images) that are displayed on the touch screen. In an exemplary embodiment, a point of contact between a touch screen 114 and the user corresponds to a finger of the user.

The touch screen 114 may use LCD (liquid crystal display) technology, or LPD (light emitting polymer display) technology, although other display technologies may be used in other embodiments. The touch screen 114 and the display controller 146 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 114.

A touch-sensitive display in some embodiments of the touch screen 114 may be analogous to the multi-touch sensitive tablets described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in their entirety. However, a touch screen 114 displays visual output from the portable mobile or computing device 210, whereas touch sensitive tablets do not provide visual output.

A touch-sensitive display in some embodiments of the touch screen 114 may be as described in the following applications: (1) U.S. patent application Ser. No. 11/381,313, "Multipoint Touch Surface Controller," filed May 1, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

The touch screen 114 may have a resolution in excess of 1000 dpi. In an exemplary embodiment, the touch screen has a resolution of approximately 1060 dpi. The user may make contact with the touch screen 114 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, the mobile or computing device 210 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 114 or an extension of the touch-sensitive surface formed by the touch screen.

In some embodiments, the mobile or computing device 210 may include a physical or virtual click wheel as an input control device 134. A user may navigate among and interact with one or more graphical objects (henceforth referred to as icons) displayed in the touch screen 114 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 152 as well as one or more of the modules and/or sets of instructions in memory 116. For a virtual click wheel, the click wheel and click wheel controller may be part of the touch screen 114 and the display controller 146, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

The mobile or computing device 210 also includes a power system 114 for powering the various components. The power system 114 may include a power management system, one or more power sources (e.g., battery 154, alternating current (AC)), a recharging system, a power failure detection circuit, a power converter or inverter, a power status indicator (e.g., a light-emitting diode (LED)) and any other components associated with the generation, management and distribution of power in portable devices.

The mobile or computing device 210 may also include one or more sensors 138, including not limited to optical sensors 138. FIG. 3 illustrates how an optical sensor is coupled to an optical sensor controller 148 in I/O subsystem 132. The optical sensor 138 may include charge-coupled device (CCD) or complementary metal-oxide semiconductor (CMOS) phototransistors. The optical sensor 138 receives light from the environment, projected through one or more lens, and converts the light to data representing an image. In conjunction with an imaging module 158 (also called a camera module); the optical sensor 138 may capture still images or video. In some embodiments, an optical sensor is located on the back of the mobile or computing device 210, opposite the touch screen display 114 on the front of the device, so that the touch screen display may be used as a viewfinder for either still and/or video image acquisition. In some embodiments, an optical sensor is located on the front of the device so that the user's image may be obtained for videoconferencing while the user views the other video conference participants on the touch screen display. In some embodiments, the position of the optical sensor 138 can be changed by the user (e.g., by rotating the lens and the sensor in the device housing) so that a single optical sensor 138 may be used along with the touch screen display for both video conferencing and still and/or video image acquisition.

The mobile or computing device 210 may also include one or more proximity sensors 150. In one embodiment, the proximity sensor 150 is coupled to the peripherals interface 122. Alternately, the proximity sensor 150 may be coupled to an input controller in the I/O subsystem 132. The proximity sensor 150 may perform as described in U.S. patent application Ser. No. 11/241,839, "Proximity Detector In Handheld Device," filed Sep. 30, 2005; Ser. No. 11/240,788, "Proximity Detector In Handheld Device," filed Sep. 30, 2005; Ser. No. 13/096,386, "Using Ambient Light Sensor To Augment Proximity Sensor Output"; Ser. No. 11/586,862, "Automated Response To And Sensing Of User Activity In Portable Devices," filed Oct. 24, 2006; and Ser. No. 11/638,251, "Methods And Systems For Automatic Configuration Of Peripherals," which are hereby incorporated by reference in their entirety. In some embodiments, the proximity sensor turns off and disables the touch screen 114 when the multifunction device is placed near the user's ear (e.g., when the user is making a phone call). In some embodiments, the proximity sensor keeps the screen off when the device is in the user's pocket, purse, or other dark area to prevent unnecessary battery drainage when the device is a locked state.

In some embodiments, the software components stored in memory 116 may include an operating system 160, a communication module (or set of instructions) 162, a contact/motion module (or set of instructions) 164, a graphics module (or set of instructions) 168, a text input module (or set of instructions) 170, a Global Positioning System (GPS) module (or set of instructions) 172, and applications (or set of instructions) 172'.

The operating system 160 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 162 facilitates communication with other devices over one or more external ports 174 and also includes various software components for handling data received by the Network Systems circuitry and/or the external port 174. The external port 174 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Computer, Inc.) devices.

The contact/motion module 162 may detect contact with the touch screen 114 (in conjunction with the display controller 146) and other touch sensitive devices (e.g., a touchpad or physical click wheel). The contact/motion module 162 includes various software components for performing various operations related to detection of contact, such as determining if contact has occurred, determining if there is movement of the contact and tracking the movement across the touch screen 114, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 164 and the display controller 146 also detects contact on a touchpad. In some embodiments, the contact/motion module 164 and the controller 118 detects contact on a click wheel.

Examples of other applications that may be stored in memory include other word processing applications, JAVA-enabled applications, encryption, digital rights management, voice recognition, and voice replication.

In conjunction with touch screen 114, display controller 146, contact module 164, graphics module 168, and text input module 170, a contacts module may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone, video conference, e-mail, or IM; and so forth.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Particularly, while the concept "component" is used in the embodiments of the systems and methods described above, it will be evident that such concept can be interchangeably used with equivalent concepts such as, class, method, type, interface, module, object model, and other suitable concepts. Embodiments were chosen and described in order to best describe the principles of the invention and its practical application, thereby enabling others skilled in the relevant art to understand the claimed subject matter, the various embodiments and with various modifications that are suited to the particular use contemplated.

What is claimed is:

1. A door lock system with a knob comprising:
a position sensing device to sense position of a drive shaft of the door lock system to assists in locking and unlocking the bolt in response to communication with an user's mobile device;
an engine with a memory coupled to the position sensing device and a wireless communication device, the engine executing instructions received from the user's mobile device to execute operation of the door lock system;
an energy source coupled to position sensing device and the engine to supply energy therein;
the door lock system with a proximity sensor configured to provide that when the user's mobile device is at an exterior of a dwelling and in a close proximity to the dwelling, the user's mobile device is utilized to unlock the door;
an apparatus that controls transmission of displacement or rotational mechanical energy coupled to the position sensing device and the engine;
a bolt coupled to a door, the bolt coupled to an input rod and an output rod, the bolt locking and unlocking a door in response transmission of displacement or delivery of rotational mechanical energy when the actuation device is actuated by the user's mobile device;
the wireless communication device coupled to the apparatus and in communication with a mobile device, with the mobile device providing authorization to engage the apparatus to controls transmission of displacement or rotational mechanical energy and allows a user to manually open the door; and a haptic device provides a visual indication that the bolt of lock device has reached a home open position verses a final position so user does not over-torque when turn the knob to open the door after the door lock system received authorized from the mobile device.

2. The system of claim 1, further comprising:
an actuator coupled to the apparatus that controls transmission of displacement or rotational mechanical energy, the actuator enabling enable the apparatus to provide its operation of transmission of displacement or rotational mechanical energy to the bolt.

3. The system of claim 1, further comprising:
an audio or visual indicator that provides a confirmation of a door locking.

4. The system of claim 1, wherein the system is configured to identify the door user based on a door user's habits.

5. The system of claim 1, wherein the door is unlocked by movement of the input rod, output rod and the bolt.

6. The system of claim 1, wherein the energy source is one or more batteries.

7. The system of claim 6, wherein the batteries are positioned in an interior of the knob.

8. The system of claim 1, wherein the knob has a first end section and a section end section.

9. The system of claim 8, wherein the first end section is closer to the to the door bolt than the second end section.

10. The system of claim 8, wherein the apparatus that controls transmission of displacement or rotational mechanical energy is at the first end section of the knob.

11. The system of claim 8, wherein the apparatus that controls transmission of displacement or rotational mechanical energy is in an interior of the first end section.

12. The system of claim 1, wherein the energy source and the wireless communication device are positioned in an interior of the knob.

13. The system of claim 1, wherein following authorization the apparatus that controls transmission of displacement or rotational mechanical is operated and engaged.

14. The system of claim 1, wherein following authorization, the knob is moved which causes the output rod to move.

15. The system of claim 1, further comprising:
a device that converts energy into mechanical energy coupled to a circuit, the input rod and the device that converts energy being coupled to the energy source to receive energy from the energy source.

16. The system of claim 1, wherein the input rod and the output rod are inter-changeable relative to door opening and access.

17. The system of claim 1, wherein the device that converts energy into mechanical energy imparts movement to the input rod.

18. The system of claim 1, further comprising:
an RF transmitter or receiver.

19. The system of claim 1, further comprising:
a knock sensor.

20. The system of claim 1, further comprising:
an audio speaker or audio microphone coupled to the circuit.

21. The system of claim 1, further comprising:
one or more LED's coupled to the circuit.

22. The system of claim 1, further comprising:
one or more buttons for locking.

23. The system of claim 1, wherein the knob is a door handle.

24. The system of claim 1, further comprising:
a circuit; and
an engine with a memory coupled to the circuit and the wireless communication device.

25. The system of claim 1, wherein the apparatus that controls transmission of displacement or rotational mechanical energy is a clutch with first and second elements configured to be engaged and disengaged.

* * * * *